United States Patent [19]
Sakaue et al.

[11] Patent Number: 4,633,159
[45] Date of Patent: Dec. 30, 1986

[54] CHARGING CIRCUIT

[75] Inventors: Hironobu Sakaue, Shijonawate; Kaoru Furukawa, Hikone, both of Japan

[73] Assignee: Matsushita Electric Works, Ltd., Osaka, Japan

[21] Appl. No.: 726,780

[22] Filed: Apr. 24, 1985

[30] Foreign Application Priority Data

Jun. 11, 1984 [JP] Japan ................... 59-119295

[51] Int. Cl.$^4$ .................. H02J 7/10; H02M 5/458
[52] U.S. Cl. ......................... 320/39; 363/37; 363/142
[58] Field of Search ............ 320/39, 40; 363/37, 363/142, 143

[56] References Cited

U.S. PATENT DOCUMENTS 3,869,657 3/1975 Shoji et al. ..................... 320/39
4,284,944 8/1981 Iwanaga et al. ................ 320/39 X
4,422,032 12/1983 Kakumoto et al. .............. 320/39
4,551,666 11/1985 Wada et al. ..................... 320/40 X

FOREIGN PATENT DOCUMENTS 39137 4/1981 Japan.

Primary Examiner—William B. Perkey
Attorney, Agent, or Firm—Burns, Doane, Swecker & Mathis

[57] ABSTRACT

A charging circuit comprises a bypassing transistor connected at the collector and base respectively to the base and emitter of a switching transistor connected to the primary winding of a transformer for inducing a charging current in the secondary winding of the transformer forming a part of a secondary battery charging path, and a current detecting resistance and constant voltage element connected between the base and emitter of the bypassing transistor so that, when the peak of a collector current of the switching transistor exceeds a predetermined level, the bypassing transistor is conducted to bypass and reduce the base current of the switching transistor, the collector current of the switching transistor is thereby reduced, and the charging current substantially constant at the average value is generated regardless of the voltage of a selective one of different power sources.

6 Claims, 10 Drawing Figures 4,633,159

CHARGING CIRCUIT

TECHNICAL BACKGROUND OF THE INVENTION

This invention relates generally to charging circuits for a storage battery and, more particularly, to a circuit to be contained in such a small electric device as electric shavers or the like which are self-contained, for charging the battery also contained therein.

The charging circuits of the type referred to include at least a rectifier circuit and an inverter circuit, which are arranged so that an A.C. source current will be rectified by the rectifier circuit to be provided as a constant voltage to the inverter circuit, a voltage energy accumulated in a transformer included in the inverter circuit will be induced at the secondary winding of the transformer in response to an oscillation of the inverter circuit and the battery connected to the secondary winding will be charged by this energy, and this inverter type charging circuit is useful in recharging specifically an alkaline storage battery in the self-contained electric shaver and the like.

DISCLOSURE OF PRIOR ART

As known charging circuits of the type referred to, there can be enumerated the ones disclosed in Japanese Patent Publication No. 56-39173 and U.S. Pat. No. 4,422,032. Specifically in the case of the Japanese Publication, a rectified current is obtained through a rectifier circuit provided with rectifying diodes connected to an A.C. power source and with a smoothing capacitor, and a rectified voltage is applied to an inverter circuit through a voltage switching circuit which generates a constant voltage in either case where the source voltage is 200V or 100V, the voltage in the former case being decreased through an impedance element but in the latter case being caused to bypass the element. The inverter circuit includes a transformer for accumulating therein a voltage energy and a switching transistor connected at the collector to the primary winding of the transformer and at the base to a feedback winding coupled to the primary winding in positive feedback relation thereto, and a storage battery is connected to a charging circuit including a diode and formed to include the secondary winding of the transformer.

When a power source voltage is supplied to this charging circuit, therefore, a bias current is caused to flow to the base of the transistor through the rectifier circuit, voltage switching circuit and a starting resistance, and a current also starts to flow to the collector of the transistor, upon which the positive feedback is provided to the feedback winding of the transformer and thus the transistor is quickly conducted. The diode in the charging circuit is connected so as to be of an opposite polarity during the conduction of the transistor with respect to the current induced in the secondary winding of the transformer and no charging current flows to the battery. On the other hand, as the collector current as well as the collector-emitter voltage increase, the voltage being applied to the primary winding starts to decrease, the bias current of the transistor correspondingly decreases through the feedback winding, the positive feedback operation through the feedback winding promotes the decrease in the bias current, and the transistor is quickly made non-conductive. At this time, the energy so far accumulated in the transformer is induced in the secondary winding and the induced current is made to be in the normal direction with respect the diode so as to be fed to the battery. This operation is repeated for respective oscillating cycles of the transistor to achieve the battery charging.

The foregoing charging circuit of the Japanese Publication can be used in both areas employing the power source voltage of 100V and 200V. In other areas, however, there are used practically various source voltages of, for example, 110V, 120V 127V, 220V and 240V, in addition to 100V and 200V, and it should be apparent that provisions in the charging circuit of such automatic voltage switching circuits as in the Japanese Publication and adapted to be used with all of these seven different source voltages will naturally result in a remarkable increase in the number of parts which requiring a complicated circuit arrangement and high costs and power consumption. Yet, in an event where such a large number of voltage switching circuits are arranged merely in a row to cope with such a wide range of the source voltages in the charging circuit of the Japanese Publication, it is difficult to obtain a constant output voltage from the respective voltage switching circuits and the inverter circuit including the switching element disadvantageously becomes unstable in the oscillating cycle.

TECHNICAL FIELD OF THE INVENTION

A primary object of the present invention is, therefore, to provide an inverter type charging circuit for a storage battery in electric shavers and the like small electric devices self-contained, which circuit can effectively realize the charging operation for a wide range of power source voltages with a simplified circuit arrangement for a higher economy as compared with any known charging circuit having substantially the same function, and ensure smooth battery charging all the time with an inverter circuit stabilized in the oscillating cycle.

According to the present invention, this object can be realized by provided between the base and emitter of a switching transistor included in the inverter circuit a bypassing transistor as connected at its collector to the base and at its base to the emitter of the switching transistor, and inserting between the base and emitter of this bypassing transistor a current detecting resistance connected in series with the emitter of the switching transistor and a constant voltage element connected in parallel with the resistance so that, when the peak of the collector current of the switching transistor is higher than a predetermined level, the bypassing transistor is conducted to bypass and reduce the base current of the switching transistor and to thereby decrease the collector current of the switching transistor, whereby the oscillation of the switching transistor is stabilized.

Other objects and advantages of the present invention shall become clear from the following description of the invention detailed with reference to preferred embodiments illustrated in accompanying drawings.

Figure 1:
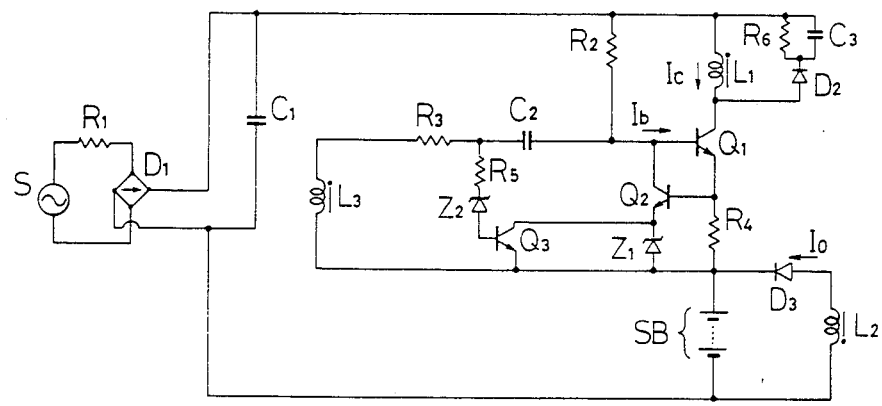
FIG. 1 is a circuit diagram of an embodiment of a charging circuit according to the present invention.

While the present invention shall now be described with reference to the preferred embodiments shown in the drawings, it should be understood that the intention is not to limit the invention only to the particular embodiments shown but rather to cover all alterations, modifications and equivalent arrangements possible within the scope of appended claims.

DISCLOSURE OF PREFERRED EMBODIMENTS

Referring to FIG. 1, there is shown an embodiment of a charging circuit according to the present invention, in which an alternating current supplied through a protective resistance $R_1$ from a commercial power source S is rectified and smoothed by a rectifier circuit of diode $D_1$ and capacitor $C_1$ to be applied to a subsequent stage circuit as a rectified voltage $V_{rec}$. The rectifier circuit is connected at its output terminal with an end of the primary winding $L_1$ of a transformer T, the other end of the winding $L_1$ being connected with the collector of a switching transistor $Q_1$, while a starting resistance $R_2$ is inserted between the base of the transistor $Q_1$ and the output terminal of the rectifier circuit. The transistor $Q_1$ is connected at the emitter with the base of a bypassing transistor $Q_2$ which in turn is connected at the collector to the base of the switching transistor $Q_1$ and at the emitter to a first Zener diode $Z_1$ forming a constant-voltage element.

The switching transistor $Q_1$ is connected also at the base through a speed-up capacitor $C_2$ and a bias resistance $R_3$ to an end of a feedback winding $L_3$ which is coupled in positive feedback relationship to the primary winding $L_1$ of the transformer T, while the other end of the feedback winding $L_3$ is connected to the Zener diode $Z_1$. To the junction between the emitter of the transistor $Q_1$ and the base of the transistor $Q_2$, an end of a current detecting resistance $R_4$ is connected, while the other end of this resistance $R_4$ is connected to a terminal of a storage battery SB and also to the junction between the feedback winding $L_3$ and the Zener diode $Z_1$. The junction between the emitter of the bypassing transistor $Q_2$ and the Zener diode $Z_1$ is connected to the collector of a voltage switching transistor $Q_3$ achieving a voltage detecting function, the transistor $Q_3$ being connected at the base to a second Zener diode $Z_2$ which is connected through a current limiting resistance $R_5$ to the junction between the bias resistance $R_3$ and the speed-up capacitor $C_2$, and at the emitter to the junction between the feedback winding $L_3$ of the transformer T and the first Zener diode $Z_1$.

Across the both ends of the primary winding $L_1$ of the transformer T, there are connected a diode $D_2$ and a parallel circuit of a resistance $R_6$ and capacitor $C_3$ in order to absorb a spike voltage generated in the primary winding $L_1$. A secondary winding $L_2$ of the transformer T is connected at one end through a rectifying diode $D_3$ to the junction between the current detecting resistance $R_4$ and the battery SB, and at the other end to the junction between the rectifier circuit and the other terminal of the battery SB, so that the secondary winding $L_2$ and rectifying diode $D_3$ will form a charging path for the battery SB.

Figure 2:
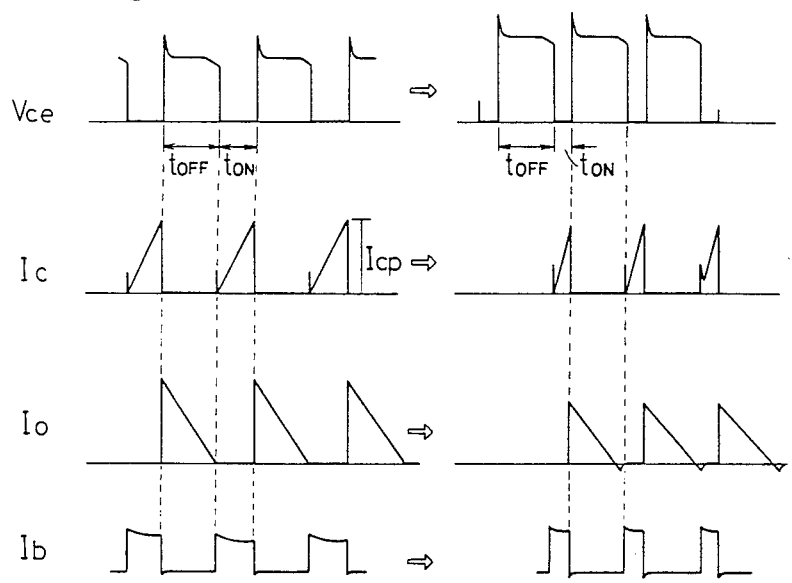
FIG. 2 shows waveforms of various signals appearing at various parts in the charging circuit of FIG. 1, in which the signals for relatively lower power source voltages are shown respectively in comparison with each of those for relatively higher power source voltages which elevate the switching transistor collector current.

Now, the operation of the charging circuit of FIG. 1 shall be described with reference to an event where the charging circuit is connected to an A.C. power source S of, for example, a voltage in a range between 110V and 130V which is different from that which has been employed for a previous charging. With the connection, the collector current in the switching transistor $Q_1$ increases, upon which a voltage drop $V_{dr}$ is caused to occur across the current detecting resistance $R_4$ connected to the emitter of the transistor $Q_1$, and its emitter voltage increases. If this voltage drop $V_{dr}$ is larger than the sum of a voltage drop $V_{dbe}$ occurring across the base and emitter of the bypassing transistor $Q_2$ and another voltage drop $V_{dz}$ across the Zener diode $Z_1$, that is, $V_{dr} > V_{dbe} + V_{dz}$, then the transistor $Q_2$ will be conducted so that a base current $I_b$ of the switching transistor $Q_1$ will be bypassed to the transistor $Q_2$, whereby the base current $I_b$ of the transistor $Q_1$ is decreased so as to also decrease a collector current $I_c$ of the transistor $Q_1$. This collector current $I_c$ is in practice such a high frequency pulsating current as shown in FIG. 2 and, when the peak value of the collector current $I_c$ exceeds a predetermined level in its waveform as shown and the emitter voltage of the switching transistor $Q_1$ increases to satisfy the above condition of $V_{dr} > V_{dbe} + V_{dz}$, the base current $I_b$ is restrained and consequently the collector current $I_c$ is controlled not to exceed the predetermined level.

When, on the other hand, the charging circuit is connected to a power source of a voltage between 200V and 240V, a voltage across the feedback winding $L_3$ of the transformer T becomes high so that a voltage higher than the breakdown voltage of the second Zener diode $Z_2$ will be applied to the diode $Z_2$, whereby a bias current is provided to the base of the voltage switching transistor $Q_3$ to conduct it. When the voltage drop $V_{dr}$ across the resistance $R_4$ becomes larger than the voltage drop $V_{dbe}$ between the base and emitter of the transistor $Q_2$ during the conduction of the transistor $Q_3$, i.e., $V_{dr} > V_{dbe}$, the base current of the switching transistor $Q_1$ will be bypassed to the transistor $Q_3$. As a result, when the source voltage is high, the base current $I_b$ of the transistor $Q_3$ is correspondingly decreased and the collector current $I_c$ is also controlled not to exceed the predetermined level.

Now, the charging operation of the present embodiment will be described with reference to waveforms shown in FIG. 2. In the drawing, waveforms of signals shown on the right side are respectively for a power source voltage higher than that of the respective signals on the left side, the peak value of the collector current of the transistor $Q_1$ due to which voltage exceeding the predetermined level so that the operating condition will be such that the charging circuit is decreasing the collector current of the transistor $Q_1$. When the transistor $Q_1$ remains conductive, i.e., the collector-emitter voltage $V_{ce}$ of the transistor $Q_1$ is zero, the collector current $I_c$ will be linearly increased to its peak value $I_{cp}$ (a product of amplification factor $h_{fe}$ multiplied by base current $I_b$). During this conduction of the transistor $Q_1$, the rectifying diode $D_3$ shows a reverse polarity with respect to a charging current $I_o$ induced in the secondary winding $L_2$ through the primary winding $L_1$ of the transformer T, and the current $I_o$ does not flow to the battery SB. When the collector current of the transistor $Q_1$ reaches the peak value to turn the transistor $Q_1$ nonconductive, the collector-emitter voltage $V_{ce}$ of the transistor $Q_1$ becomes relatively low, upon which the energy having been accumulated in the primary winding $L_1$ of the transformer T is induced in the secondary winding $L_2$, whereby the charging current $I_o$ is caused to flow through the diode $D_3$ in its normal direction and the charging operation of the storage battery SB is attained. This operation can be repeated upon every non-conduction of the transistor $Q_1$ until the battery SB is fully charged.

When the source voltage is altered from the one to another, on the other hand, the collector-emitter voltage $V_{ce}$ during the conduction of the transistor $Q_1$ becomes relatively high, the voltage drop $V_{dr}$ across the current detecting resistance $R_4$ reaches a level of satisfying, for example, the formula $V_{dr} > V_{dbe} + V_{dz}$, the base current $I_b$ of the transistor $Q_1$ decreases to have the collector current $I_c$ also decreased, and the conduction time of the transistor $Q_1$ is shortened. As a result, the amount of energy accumulated in the transformer T during each conduction through non-conduction cycle of the transistor $Q_1$ becomes, at the average value, substantially the same as that in the case where the source voltage is relatively low, so that the charging current for the storage battery SB will be kept substantially constant.

Figure 3:
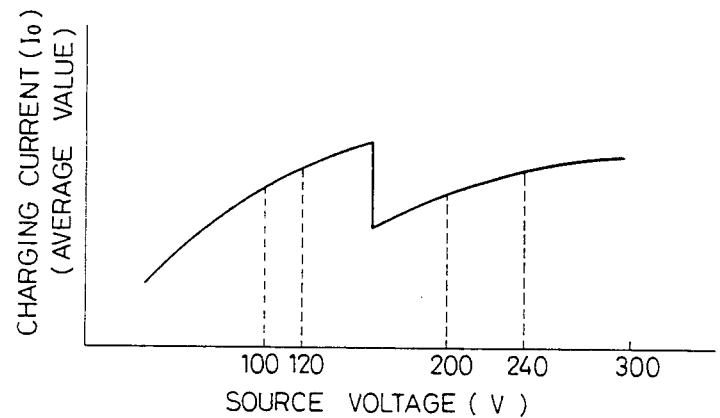
FIG. 3 shows diagrammatically a relationship between the input source voltage and the output charging current of the charging circuit of FIG. 1.

It should be appreciated that, even when the source voltage is altered specifically from the 100V level to the 200V level, the charging current $I_o$ induced in the secondary winding $L_2$ of the transformer T can be made substantially constant in the average value, by setting the operational voltage of the voltage detecting Zener diode $Z_1$ to be the one which turns from one to the other at a level of, for example, about 160V and the operational value of the Zener diode $Z_2$ and resistance value of the current limiting resistance $R_5$ to be optimum, as seen in FIG. 3 where the source voltage is in the range of 100V to 240V or more.

Figure 4:
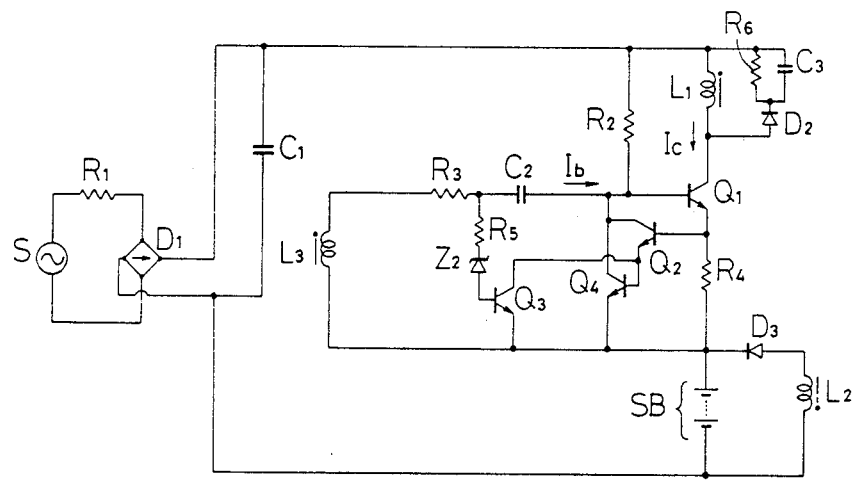
FIG. 4 is a circuit diagram of another embodiment of the charging circuit according to the present invention.

Shown in FIG. 4 is another embodiment in which the same constituent elements as those in the embodiment of FIG. 1 are represented by the same reference numerals. In the present embodiment, specifically, the Zener diode $Z_1$ connected to the emitter of the bypassing transistor $Q_2$ in FIG. 1 is replaced by another transistor $Q_4$ provided as constant-voltage element for the transistor $Q_2$ and in Darlington connection thereto, with which arrangement the same operation as that of the Zener diode $Z_1$ of FIG. 1 can be attained as the base-emitter junction of the transistors $Q_1$ and $Q_4$ is utilized therefor. Other arrangement and operation are substantially the same as those of the embodiment of FIG. 1 and, when the charging circuit is connected to a source of any different voltage, the battery SB can be charged with substantially the same charging current $I_o$.

Figure 6:
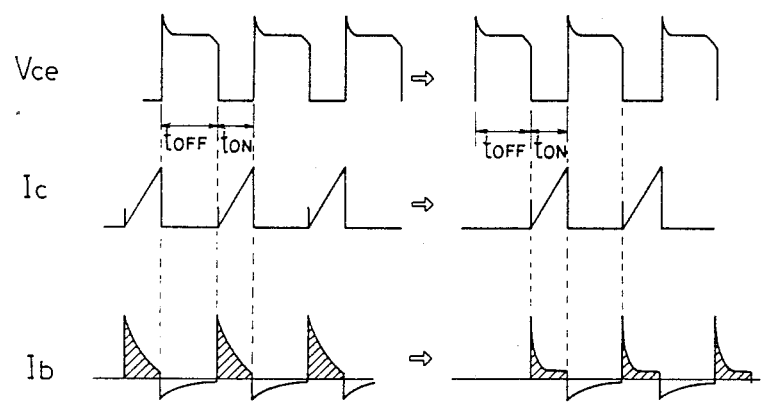
FIG. 6 shows waveforms of signals appearing at various parts in the charging circuit of FIG. 5 and under different operating states respectively as shown in comparison with each other.
Figure 5:
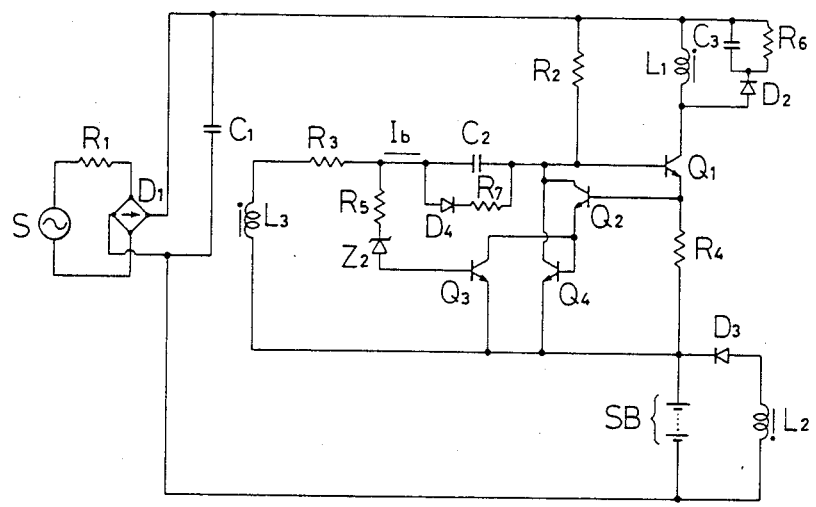
FIG. 5 is a circuit diagram of still another embodiment of the charging circuit according to the present invention.

FIG. 5 shows still another embodiment of the present invention, wherein the same constituent elements as those in the embodiments of FIGS. 1 and 4 are represented by the same reference numerals. The present embodiment is similar to that of FIG. 4 in respect of the transistor $Q_4$ provided in Darlington connection to the bypassing transistor $Q_2$ as a constant-voltage element, but is different therefrom in that a series circuit of a diode $D_4$ and resistance $R_7$ is connected in parallel with the speed-up capacitor $C_2$ for restraining the rectified current flowing through the starting resistance $R_2$ to the capacitor. With such arrangement, the bias current to the base of the switching transistor $Q_1$ is caused to be shared also by the resistance $R_7$ through the diode $D_4$. As a result, as will be seen in FIG. 6 and in the case when the collector-emitter voltage $V_{ce}$ is zero during the conduction of the switching transistor $Q_1$ and the collector current $I_c$ linearly rises as shown by signal waveforms on the right side of FIG. 6 and employing the resistance $R_7$ parallel to the speed-up capacitor $C_2$ in contrast to those on the left side of FIG. 6 employing only the speed-up capacitor $C_2$, the base current $I_b$ of the transistor $Q_1$ can be decreased to a remarkable extent, and a low loss charging circuit which has minimized the energy non-contributive to the charging operation can be obtained. Further, the size of the capacitor $C_2$ can be reduced by reducing its capacity so as to minimize the element which likely to become larger, so that the entire dimension of the charging circuit can be well minimized. Other arrangement and operation of the embodiment of FIG. 5 are substantially the same as those of the embodiments of FIGS. 1 and 4.

Figure 7:
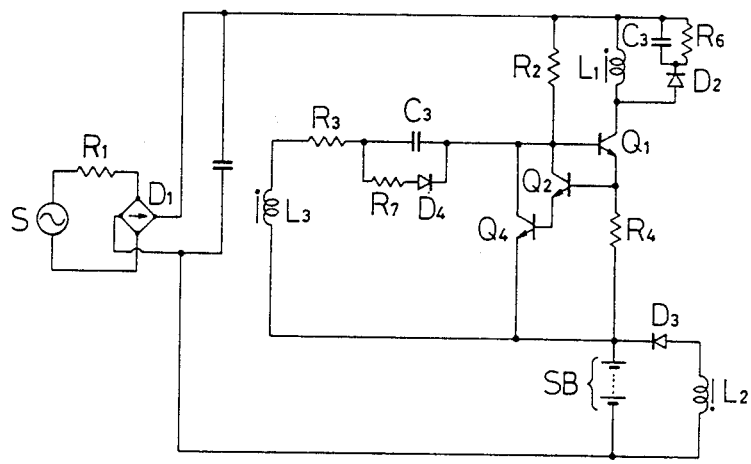
FIG. 7 is a circuit diagram of a further embodiment of the charging circuit according to the present invention.

It will be readily appreciated that, when it is only intended to have the respective embodiments of FIGS. 1, 4 and 5 adapted to the selective use with a source voltage of, for example, the 100V level only, the voltage switching transistor $Q_3$, Zener diode $Z_2$ and resistance $R_5$ may be omitted. In an embodiment shown in FIG. 7, these three elements are omitted from the circuit of FIG. 5, so that the circuit can be effectively used in the areas where the power source voltage is either one of 100V, 110V, 120V and 127V, and a charging circuit with a low power loss can be provided.

Figure 9:
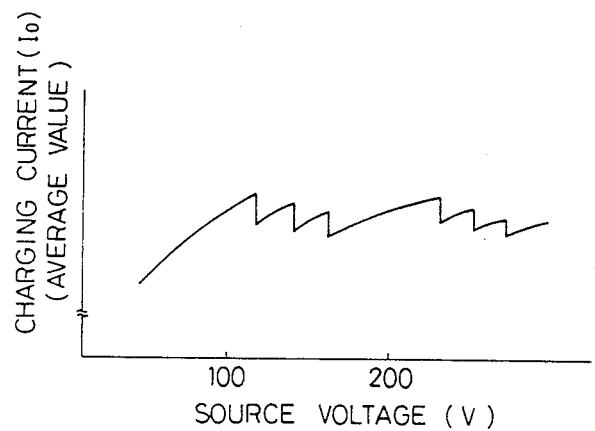
FIG. 9 shows diagrammatically a relationship between the input source voltage and the output charging current of the charging circuit of FIG. 8.
Figure 8:
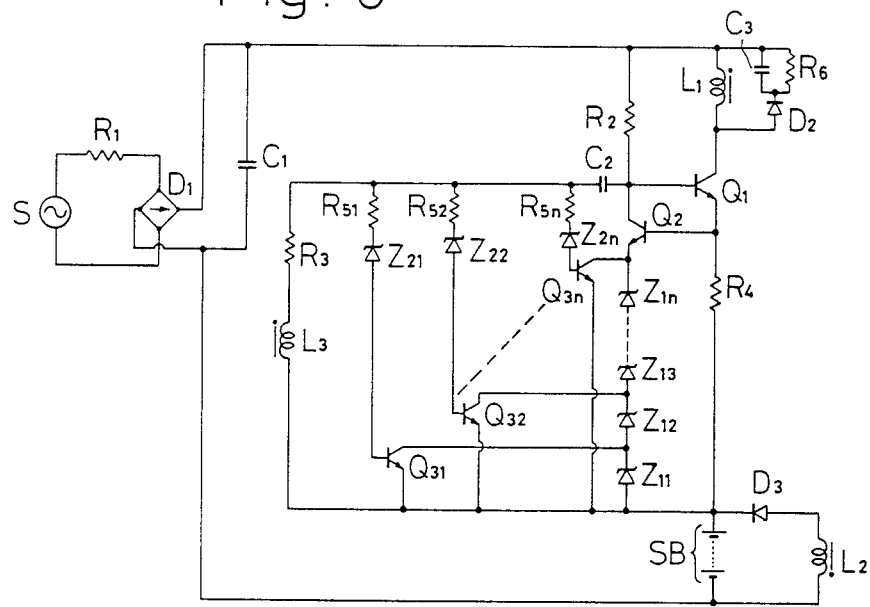
FIG. 8 is a circuit diagram of a still further embodiment of the charging circuit according to the present invention.

In FIG. 8, there is shown a further embodiment of the present invention which is a modification of the embodiment of FIG. 1, in which the same constituent elements as those in FIG. 1 are represented by the same reference numerals. In the present embodiment, specifically, the bypassing transistor $Q_2$ is connected at the emitter with a plurality of Zener diodes $Z_{11}$ to $Z_{1n}$ forming constant voltage elements, and groups comprising each of transistors $Q_{31}$ to $Q_{3n}$, Zener diodes $Z_{21}$ to $Z_{2n}$ and resistances $R_{51}$ to $R_{5n}$ and performing the voltage switching function are respectively connected to corresponding one of the Zener diodes $Z_{11}$ to $Z_{1n}$. The operating value of the respective Zener diodes $Z_{11}$ to $Z_{1n}$, transistors $Q_{31}$ to $Q_{3n}$, Zener diodes $Z_{21}$ to $Z_{2n}$ and resistances $R_{51}$ to $R_{5n}$ is so set as to vary the operating voltage of the respective groups of these elements, so that the respective groups will sequentially reach the operating voltages, and it is made possible to render the charging circuit adaptable to a variety of the source voltages at a high precision, so as to obtain from either one of them substantially the same output charging current in the average value as shown in FIG. 9.

Figure 10:
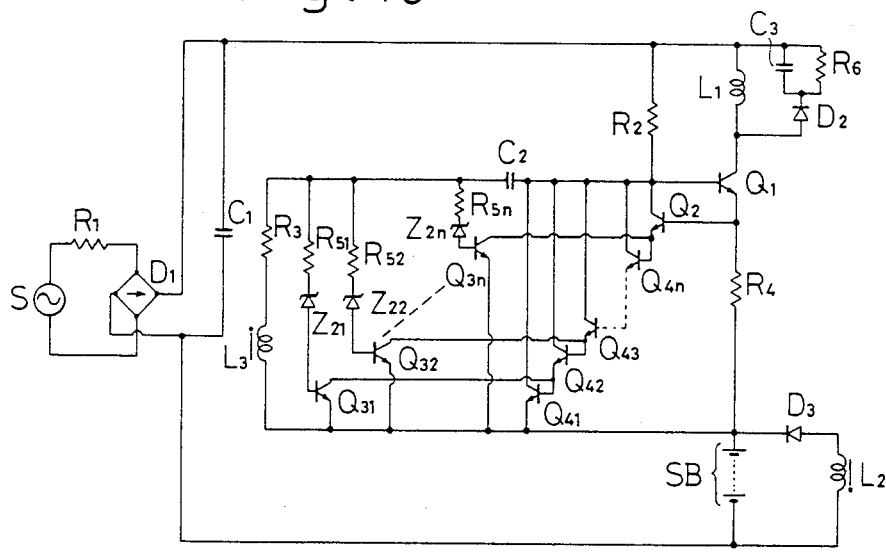
FIG. 10 is a circuit diagram of yet another embodiment of the charging circuit according to the present invention.

Referring to a still another embodiment of the present invention shown in FIG. 10 which is a modification of the embodiment of FIG. 4 as based substantially on the same idea as that of FIG. 8, the same constituent elements as those in the embodiment of FIG. 4 are represented by the same reference numerals. In the present instance, a plurality of other transistors $Q_{41}$ to $Q_{4n}$ are provided as constant voltage elements in Darlington connection sequentially with the bypassing transistor $Q_2$, and groups of each of transistors $Q_{31}$ to $Q_{3n}$, Zener diodes $Z_{21}$ to $Z_{2n}$ and resistances $R_{51}$ to $R_{5n}$ are connected respectively to corresponding one of the transistors $Q_{41}$ to $Q_{4n}$ in the Darlington connection. When the operational values of the respective groups are properly set as in the case of FIG. 8, the charging circuit can provide substantially the same output charging current in the average value with any one of the various power source voltages for effectively achieving the charging operation smoothly for the storage battery SB.

What is claimed as our invention is:

1. A charging circuit comprising:
   a transformer to which a rectified source voltage is applied and having primary, secondary, and feedback windings, wherein said feedback winding is coupled in a positive feedback relationship to said primary winding;
   a switching transistor having an emitter, a base, and a collector wherein said base is connected to said feedback winding of said transformer and said collector is connected to said primary winding of said transformer;
   a bypass transistor having an emitter, a base, and a collector wherein said base is connected to the emitter of the switching transistor forming a junction, and said collector is connected to the base of the switching transistor;
   a current detecting resistor connected at an end to said junction and connected at another end to a point between the secondary winding and feedback winding of the transformer;
   a first constant voltage means connected between the emitter of the bypass transistor and the feedback winding of the transformer;
   a voltage switching transistor having an emitter, a base, and a collector wherein said emitter is connected to a point between the secondary and feedback windings of the transformer, and said collector is connected to a point between the emitter of the bypass transistor and the first constant voltage means;
   a second constant voltage means inserted between the base of said voltage switching transistor and a junction between the base of said switching transistor and said feedback winding, and
   a storage battery connected to said secondary winding of said transformer through a diode connected thereto in normal direction with respect to a charging current induced in the secondary winding during non-conduction of said switching transistor.

2. A charging circuit according to claim 1, which further comprises a speed-up capacitor located between the base of said switching transistor and said second constant voltage means, and a current reducing resistance connected in parallel to said speed-up capacitor.

3. A charging circuit according to claim 1, wherein said first constant voltage means is a Zener diode.

4. A charging circuit according to claim 1, wherein said first constant voltage means is a transistor provided in Darlington connection with said bypass transistor.

5. A charging circuit according to claim 1, wherein said first constant voltage means comprises a series connection of a plurality of Zener diodes having stepwise different operational voltages, and said charging circuit comprises a plurality of voltage switching transistors, each having an emitter, a base, and a collector, wherein each emitter of said voltage switching transistors is connected to one end of said series connection of Zener diodes, each base of said switching transistors is connected through a second constant voltage means to the feedback winding of the transformer, and each collector of said switching transistors is connected across at least one of said plurality of Zener diodes.

6. A charging circuit according to claim 1, wherein said first constant voltage means comprises a plurality of transistors provided in Darlington connection with said bypass transistor, and said charging circuit comprises a plurality of voltage switching transistors, each having an emitter, a base, and a collector, wherein each emitter of said voltage switching transistors is connected to one end of said first constant voltage means, each base of said switching transistors is connected through a second constant voltage means to the feedback winding of the transformer, and each collector of said switching transistors is connected across at least one of said plurality of Darlington-connected transistors.

* * * * *